(12) United States Patent
Forsyth et al.

(10) Patent No.: US 8,767,358 B2
(45) Date of Patent: Jul. 1, 2014

(54) CRYOGENIC POWER CONTROL

(71) Applicant: Rolls-Royce PLC, London (GB)

(72) Inventors: Andrew John Forsyth, Manchester (GB); Chunjiang Jia, Manchester (GB); Ding Wu, Manchester (GB)

(73) Assignee: Rolls-Royce PLC, London (GB)

( * ) Notice: Subject to any disclaimer, the term of this patent is extended or adjusted under 35 U.S.C. 154(b) by 58 days.

(21) Appl. No.: 13/733,474

(22) Filed: Jan. 3, 2013

(65) Prior Publication Data

US 2013/0184159 A1   Jul. 18, 2013

(30) Foreign Application Priority Data

Jan. 16, 2012   (GB) .................................. 1200614.4

(51) Int. Cl.
*H01F 6/06*   (2006.01)
*H01F 6/02*   (2006.01)
*H01F 6/00*   (2006.01)
*H01F 41/04*   (2006.01)

(52) U.S. Cl.
CPC .................. *H01F 6/02* (2013.01); *H01F 6/008* (2013.01); *H01F 41/048* (2013.01); *H01F 6/06* (2013.01)
USPC ............................................ 361/19; 505/163

(58) Field of Classification Search
USPC ............................................ 361/19; 505/163
See application file for complete search history.

(56) References Cited

U.S. PATENT DOCUMENTS

| | | | |
|---|---|---|---|
| 4,375,659 A | 3/1983 | Cunningham et al. | |
| 5,210,674 A | 5/1993 | Yamaguchi et al. | |
| 5,644,218 A | 7/1997 | Emmerich et al. | |
| 5,650,903 A | 7/1997 | Gross et al. | |
| 5,731,939 A | 3/1998 | Gross et al. | |
| 5,739,997 A | 4/1998 | Gross | |
| 5,965,959 A * | 10/1999 | Gamble et al. | ................ 307/125 |
| 6,147,844 A | 11/2000 | Huang et al. | |
| 7,898,778 B2 | 3/2011 | Kurusu et al. | |
| 8,400,747 B2 * | 3/2013 | Ichiki et al. | .................... 361/141 |
| 2010/0253373 A1 | 10/2010 | Kawashima | |

FOREIGN PATENT DOCUMENTS

JP  A 2009-69278  4/2009
WO  WO 2011/101587 A1  8/2011

OTHER PUBLICATIONS

Apr. 30, 2012 Search Report issued in British Patent Application No. GB1200614.4.
Huang et al; "An Active Quench Protection System for MRI Magnets;" IEEE Transactions on Applied Superconductivity; Jun. 2010; vol. 20, No. 3; pp. 2091-2094.

* cited by examiner

*Primary Examiner* — Danny Nguyen
(74) *Attorney, Agent, or Firm* — Oliff PLC

(57) ABSTRACT

An apparatus 2 comprising a cryogenic chamber 4 and a galvanic input interface 6 to the cryogenic chamber 4 configured to receive a lower amplitude electric current 8. A converter 10 is located within the cryogenic chamber 4 and configured to convert the lower amplitude electric current 8, provided by the galvanic input interface 6, to a higher amplitude electric current 12 for supply to a load 14 within the cryogenic chamber 4. A controller 16 is configured to control the converter 10 and to detect the onset of quench by comparing the duration of the charge/discharge cycle of the convertor with a stored value. The controller 16 may also compare an instantaneous value of load current with a stored value of load current.

16 Claims, 2 Drawing Sheets

CRYOGENIC POWER CONTROL

Figure 1:
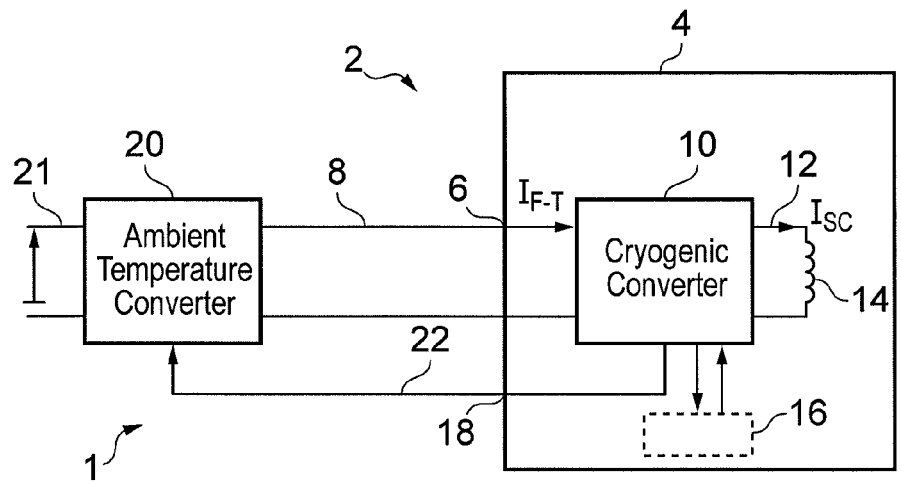

The present invention relates to the monitoring of a cryogenic power system, typically for the purpose of cryogenic power control.

It is known to make use of a cryogenic chamber in order to control the temperature of superconducting components of an electrical machine. It is desirable to provide variable electric power to a load within a cryogenic chamber. The load may, for example, be a super-conducting coil such as, for example, the field winding of an electrical machine.

However, the extreme conditions of the cryogenic chamber present a number of problems that need to be overcome. Any heat energy dissipated within a cryogenic environment can cause significant detriment to the electrical system and its operation. A quench incident can arise when a super-conducting member, or portion thereof, transitions from a superconducting state to a resistive state, in which it becomes dissipative. The resulting energy loss and heat generation in the quenched portion can cause rapid heating and thus damage to the member and/or other associated electrical components.

The active detection of quench onset conditions may involve monitoring voltage across a superconducting member, such as a coil. An increase in voltage across the coil may be determined to indicate the possible initiation of quench. However the voltages involved are relatively small and quench can occur over a very short time scale. Accordingly it is a challenge to accurately discriminate between quench onset and other system disturbances or variants.

It is an aim of the present invention to provide a cryogenic power system and an associated controller which mitigates the above problems.

According to the invention there is provided an apparatus comprising: a cryogenic chamber; a device for storing electric charge located within the chamber, the device being connected to an interface to the exterior of chamber and to a load within the chamber, wherein the device operates according to predetermined charge and discharge cycles such that energy is stored and subsequently transferred to the load in a successive manner in use; and, a controller configured to monitor the charge and/or discharge cycle of the device in order to determine the onset of an adverse operating condition within the chamber.

The controller may monitor the duration and/or frequency of a charge and/or discharge cycle of the device.

The device may be arranged to transfer a predetermined quantum of energy to the load during the, or each, discharge cycle. The device may be charged to a predetermined level or magnitude during the, or each, charge cycle.

The invention is particularly beneficial in that the controller can simply assess the onset of quench by identifying a change in the rate of charge and/or the duration of the charging cycle. This can be achieved, for example, if the charge/discharge cycle is predetermined in that the device is arranged to discharge to the load when the voltage achieves a predetermined magnitude. Thus if the device discharges fully with each cycle, a predetermined quantum of energy is transferred to the load in an iterative, or cyclic manner in normal use. The duration of a charge/discharge cycle is sufficiently small that it is possible to detect adverse conditions indicative of the onset of quench before permanent damage to the associated electrical components has occurred.

The device may comprise a capacitor. The device may be self-oscillating. The device may comprise at least one capacitor and a plurality of switches. The switches of the switching arrangement may be field effect transistors. The device may comprise at least one capacitor and a H-bridge arrangement comprising the load as a cross-bar of the H-bridge arrangement.

The device may comprise a switching arrangement for switching between a first condition, in which energy is transferred from the device to the load, and a second condition, in which the transfer of energy from the device to the load is inhibited (i.e. in which energy is not transferred to the load). The second condition may permit charging of the device. The device may be configured to operate in mutually exclusive states or conditions comprising the first and second conditions. The device may be configured, when operating in the second condition, to store electrical energy provided by a received low amplitude electric current from outside the chamber.

The mutually exclusive conditions may include a third condition in which electrical energy is transferred from the load. Additionally or alternatively the conditions may comprise a safety condition in which electrical energy is transferred from the device away from the load, for example to a dissipative member.

The controller may be arranged to monitor the current in the load. The controller may be arranged to monitor the current through a superconducting member of the load or one or more portions thereof. The controller may be arranged to compare an instantaneous monitored current in the load, for example at the time a change to the predetermined charge and/or discharge cycle is determined, with a stored current value. The stored value may comprise a predetermined threshold value and/or one or more previously monitored current values.

The controller may be arranged to compare an instantaneous current value with a plurality of previously stored values, for example in order to determine a trend in any current changes over successive cycles.

The controller may determine the onset of quench in the event that the measured current differs from the stored current value, for example if the instantaneous current is less than or equal to the stored current value.

Accordingly, by checking the current in the load, the controller is able to differentiate between changes in device charge/discharge cycle which occur due to normal operating transients in the system and changes which are associated with quench onset. An increasing current in the load in conjunction with an increase in discharge frequency will typically be indicative of a non-quench, or normal, transient in the system. However it is also noted that an increase in current which is significantly smaller than anticipated for a given rise in discharge frequency may also be indicative of quench onset.

The controller may be located in the chamber.

The controller may control operation of the device during normal use.

The controller may be arranged to inhibit further discharge to the load from the device upon determination of adverse conditions, such as quench onset. The controller may control the discharge of the device to a further device, such as a resistor. The circuitry may comprise a switching arrangement or further switching arrangement in this regard, for example which may allow for a safety discharge mode of operation, in addition to the normal charge/discharge mode(s) of operation.

The controller may be arranged to inhibit further supply of power to the device, for example from outside the chamber, upon determination of adverse conditions, such as quench onset. The controller may control a shut down sequence to prevent further operation of the apparatus.

The chamber may comprise an output interface for communication of electric energy from the interior to the exterior of the chamber. The output interface may allow communication of data signals, such as a feedback signal, to a controller located outside of the chamber.

The chamber interface may comprise a galvanic input interface to the cryogenic chamber, which may be configured to receive a lower amplitude electric current.

The apparatus may comprise a converter located within the cryogenic chamber. The converter may be configured to convert a lower amplitude electric current, provided by the galvanic input interface, to a higher amplitude electric current for supply to the load within the cryogenic chamber. The converter may comprise the device and/or circuitry The controller may be configured to control the converter. The system may also comprise a current controller located outside the cryogenic chamber and configured to control the amplitude of the lower amplitude electric current in response to a target and a feedback signal dependent upon the operation of the apparatus.

The load may comprise first and second terminals.

The converter may comprise a capacitor connected between a first common node and a second common node; a first switching arrangement configured to connect the first common node to the first terminal of the load; a second switching arrangement configured to connect the second common node to the first terminal of the load; a third switching arrangement configured to connect the first common node to the second terminal of the load; and a fourth switching arrangement configured to connect the second common node to the second terminal of the load.

The first switching arrangement and/or the third switching arrangement may comprise a plurality of switches connected in electrical parallel.

The apparatus may be configured simultaneously to switch-on the first switching arrangement and switch-off the second switching arrangement and may be configured to toggle the third switching arrangement and the fourth switching arrangement to respectively charge and discharge the capacitor, wherein the third switching arrangement is switched on and the fourth switching arrangement is switched off while an increasing voltage across the capacitor is below a maximum threshold and wherein the fourth switching arrangement is switched on and the third switching arrangement is switched off while a decreasing voltage across the capacitor is above a minimum threshold.

The lower amplitude electric current may be a continuous, non-oscillating electric current.

A current controller may be located outside the cryogenic chamber. The current controller may be configured to control the amplitude of the lower amplitude electric current in response to either (a) a target and a feedback signal dependent upon the operation of the apparatus, or (b) a rate of change of a signal measured outside the cryogenic chamber, such as a voltage provided by a capacitor within the cryogenic chamber.

According to a further aspect of the invention there is provided a method comprising: providing an electric current to a cryogenic chamber such that a device for storing electric energy within the chamber undertakes successive predetermined charge and discharge cycles, the energy stored by the device being transferred to a load within the chamber; monitoring the charge and/or discharge cycle of the device; and determining the onset of an adverse operating condition within the chamber based upon a change in the charge and/or discharge cycle.

The change may be a reduction in duration or increase in frequency of the charge/discharge cycle.

Any of the preferable features described above in relation to the first aspect of the invention may be applied to the method of the further aspect.

Figure 2:
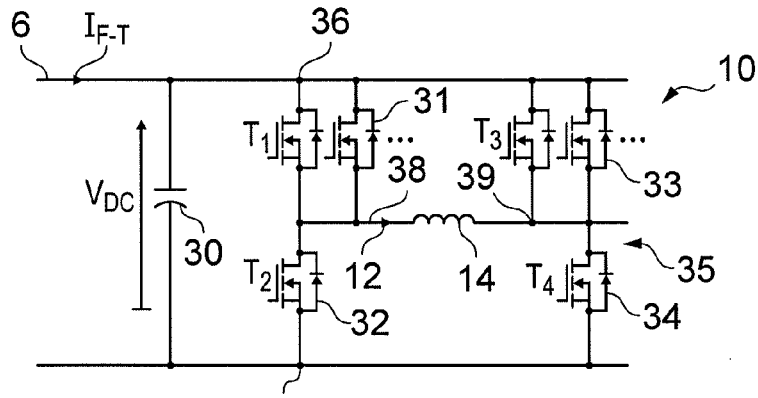
Figure 3:
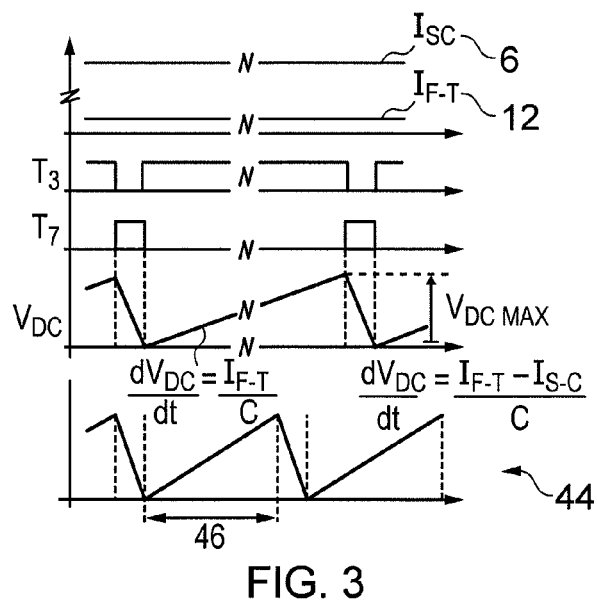
Figure 4A:
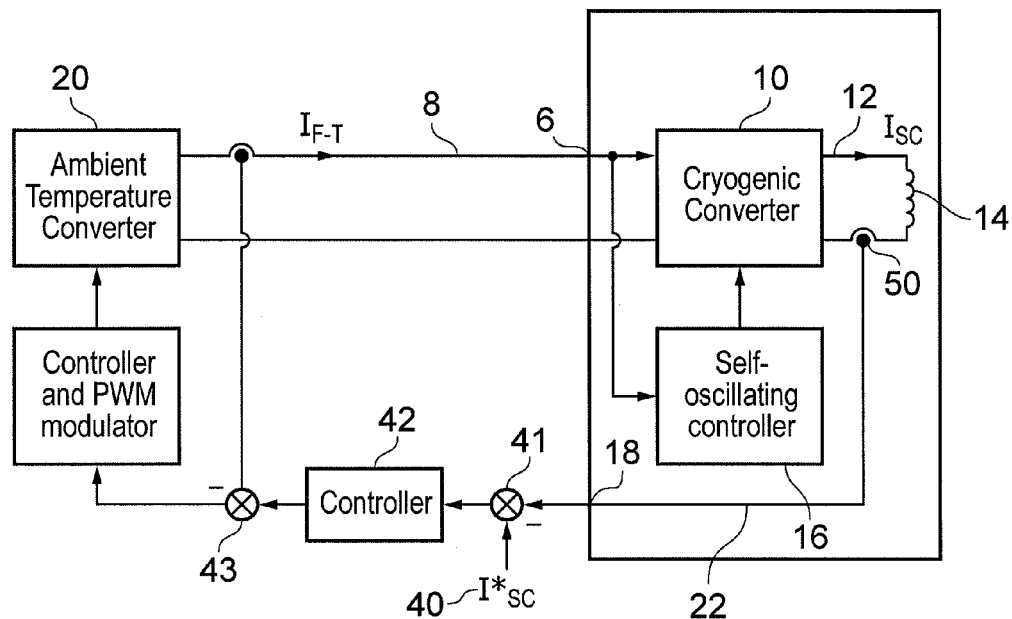
Figure 4B:
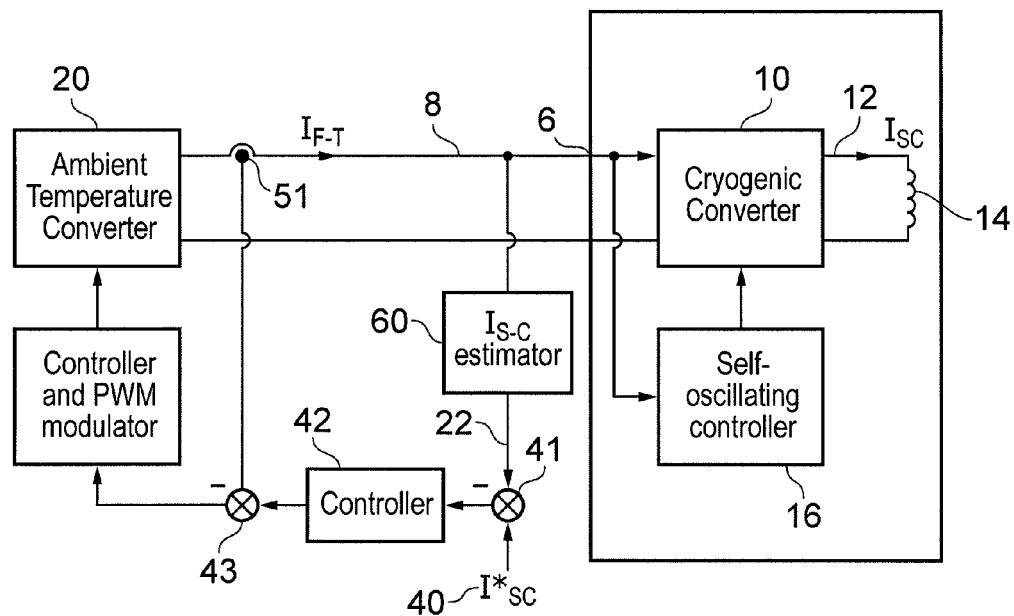

Practicable examples of the present invention are described in further detail by way of example only with reference to the accompanying drawings of which:

FIG. 1, schematically illustrates a system comprising; an apparatus comprising a device located within a cryogenic chamber and a current controller located outside a cryogenic chamber;

FIG. 2 schematically illustrates an example of a suitable cryogenic device comprising an H-bridge arrangement;

FIG. 3 illustrates operation of the cryogenic converter illustrated in FIG. 2;

FIG. 4A schematically illustrates a system in which an ambient temperature converter controls a load current in dependence upon a feedback signal that is directly measured from the load current within the cryogenic chamber; and FIG. 4B schematically illustrates a system in which an ambient temperature converter controls a load current in dependence upon a feedback signal that is inferred from measurements made outside the cryogenic chamber.

Some embodiments of the present invention, as schematically illustrated in FIGS. 1, 4A and 4B, relate to an apparatus 2 comprising: a cryogenic chamber 4; a galvanic input interface 6 to the cryogenic chamber 4 configured to receive a lower amplitude electric current 8; a converter 10 located within the cryogenic chamber 4 and configured to convert the lower amplitude electric current 8, provided by the galvanic input interface 6, to a higher amplitude electric current 12 for supply to a load 14 within the cryogenic chamber 4; and a controller 16 configured to control the converter 10.

Referring to FIG. 1, the Figure schematically illustrates a system 1 comprising; the apparatus 2 and a current controller 20 located outside the cryogenic chamber 4.

The apparatus 2 comprises: a cryogenic chamber 4; a galvanic input interface 6 to the cryogenic chamber 4 configured to receive a lower amplitude electric current 8; a converter 10 located within the cryogenic chamber 4 and configured to convert the lower amplitude electric current 8, provided by the galvanic input interface 6, to a higher amplitude electric current 12 for supply to a load 14 within the cryogenic chamber 4; and a controller 16 configured to control the converter 10 in accordance with the present invention.

The cryogenic chamber 4 is typically an insulated cryostat configured to store a low temperature liquid in its liquid phase. The cryogenic chamber may, for example, be a high temperature cryogenic chamber that stores liquids at a temperature of 20-110 K. The liquid used in a high temperature cryogenic chamber may, for example, be liquid nitrogen (77K). The cryogenic chamber may, for example, be a low temperature cryogenic chamber that stores liquids at a temperature of 4-20 K.

The cryogenic chamber 4 is typically configured, for efficiency, to have the minimum dimensions required. In embodiments of the invention, the chamber 4 has internal dimensions that are sufficient to house at least the cryogenic converter 10, the cryogenic load 14 and possibly the controller 16.

The galvanic input interface 6 to the cryogenic chamber 4 is configured to carry lower amplitude electric current 8 through the boundary of the cryogenic chamber 4. The galvanic input interface 6 is configured to balance the need for low Ohmic resistance (to avoid resistive heating of the cryogenic chamber 4) and the need for low thermal conduction (to avoid heat transfer into the cryogenic chamber 4 via the interface 6). The galvanic input interface 6 is typically a conductive interconnect such as a metal wire or lead. The fact that it carries a lower amplitude electric current 8 enables it to have a smaller cross-sectional area without causing deleterious resistive heating.

The galvanic input interface 6 may, for example, have dimensions that make it suitable for conveying only the lower amplitude electric current 8 directly into the cryogenic chamber 4 and which make it unsuitable for conveying the higher amplitude electric current 12 directly into the cryogenic chamber 4.

The converter 10 converts the lower amplitude electric current 8, which can be conveyed directly into the cryogenic chamber 4, into the higher amplitude electric current 12, which is not and cannot be directly conveyed into the cryogenic chamber 4.

The load 14 may be any suitable cryogenic load such as, for example, a super-conducting coil such as, for example, the field winding of an electrical machine.

The controller 16 may be located within the cryogenic chamber 4 (as illustrated in FIGS. 1, 4A and 4B) or it may be located outside the cryogenic chamber 4. If it is located outside the cryogenic chamber 4, an input interface is used to convey a control signal from the controller 16 to the converter 10.

The controller 16 may be configured to control when a state of the converter 10 changes. The converter 10 may, for example, be configured to operate in mutually exclusive states during normal operation including a first state in which electrical energy provided by the received lower amplitude electric current 8 is not transferred to the load 14 but stored; a second state in which the stored energy is transferred to the load 14; and a third state in which electrical energy is transferred from the load 14.

The controller 16 may be configured to periodically toggle the converter 10 between the first state and the second state to maintain the electric current through the load 14.

The current controller 20 is located outside the cryogenic chamber 4. It draws power from an energy source 21, which may have a high voltage, and produces a low amplitude electric current 8. The lower amplitude electric current 8 may for example be a continuous signal that does not oscillate or fluctuate greatly or at all.

The current controller 20 is located outside the cryogenic chamber 4 and may be considered to be an ambient temperature converter to differentiate it from the cryogenic converter 10. The current controller 20 converts power from the energy source 21, which may have a high voltage, to a low amplitude electric current 8 and the cryogenic converter converts the low amplitude electric current 8 to a high amplitude electric current 12. The lower amplitude electric current 8 and the higher amplitude electric current 12 may have average values that are non-zero.

The current controller 20 provides the lower amplitude electric current 8 directly to the cryogenic converter 10, located within the cryogenic chamber 4, via the galvanic input interface 6. The current controller 20 is configured to control the amplitude (peak power) of the lower amplitude electric current 8 in response to a feedback signal 22 dependent upon the operation of the apparatus 2.

The feedback signal 22 creates a closed feedback loop that enables the controller 20 to adjust the amplitude (peak power) of the lower amplitude electric current 8 until a target operation of the apparatus 2 as indicated by the feedback signal 22, is achieved. The feedback 22 signal may, for example, be determined either inside the cryogenic chamber 4 (FIG. 4A) or determined outside the cryogenic chamber 4 (FIG. 4B). In FIG. 4A, an output interface 18 at the cryogenic chamber 4 is configured to provide the feedback signal 22 from inside the cryogenic chamber 4.

It will therefore be appreciated from the foregoing that the system 1 is a power control system for a cryogenic load 14. If the load is a field coil winding, the system 1 operates as a superconducting magnetic field generator.

FIG. 2 schematically illustrates an example of a suitable cryogenic converter 10. In this example, the converter 10 comprises at least one capacitor 30 and an H-bridge arrangement 35 comprising the load 14 as a cross-bar of the H-bridge arrangement 35.

The H-bridge arrangement 35 comprises a first switching arrangement 31 configured to connect a first common node 36 to a first terminal 38 of the load 14, a second switching arrangement 32 configured to connect a second common node 37 to the first terminal 38 of the load 14, a third switching arrangement 33 configured to connect the first common node 36 to a second terminal 39 of the load 14, and a fourth switching arrangement 34 configured to connect the second common node 37 to the second terminal 39 of the load 14.

A switching arrangement typically comprises one or more switches. For example, the first switching arrangement 31 and/or the third switching arrangement 33 may comprise a plurality of switches connected in electrical parallel to reduce resistive heating when the switching arrangements are switched on.

Field effect transistors may be used as switches. For example metal-oxide FETs may be used. Suitable MOSFETs include n-channel enhancement mode MOSFETs that have a low on resistance and that support a large off-state forward voltage without breakdown.

A capacitor 30 is connected between the first common node 36 and the second common node 37 of the H-bridge arrangement 35. The capacitor 20 is typically a physically small component as space is typically limited within the cryogenic chamber 4, especially if it is part of an electrical machine.

Due to the small capacitor size and the current-fed arrangement, only a small amount of energy is stored in the capacitor 30, which minimizes the risk of potentially damaging transients and increases fault-tolerance.

As the capacitor 20 is located inside the cryogenic chamber 4, the connection between the capacitor 20 and the switching arrangements does not pass through the thermal barrier at the cryogenic chamber boundary and therefore does not suffer significant parasitic inductance and resistance which would be undesirable due to the very large and rapid current pulses that must flow in this part of the circuit.

The converter 10 is configured to operate in mutually exclusive states during normal operation including a first state in which electrical energy provided by the received lower amplitude electric current 8 is not transferred to the load 14 but stored, a second state in which the stored energy is transferred to the load 14, and a third state in which electrical energy is transferred from the load 14.

In the first state, the first and third switching arrangements 31, 33 are switched on to short-circuit (shunt) the load 14, allowing the current through the load 14 to freewheel (circulate). The third switching arrangement 33 operates as a synchronous rectifier and conducts in the reverse direction. The current will decay slowly due to the conduction losses in first and third switching arrangements 31, 33. The rate of decay may be reduced to a very low level by connecting many MOSFET transistors in parallel in the first and third switching arrangements 31, 33.

In the first state, the first and third switching arrangements 31, 33 are switched on, the lower amplitude electric current 8 charges the capacitor 30.

In the second state, the first and fourth switching arrangements 31, 34 are switched on to apply the capacitor voltage to the cryogenic load 14, thereby transferring energy from the capacitor 30 to the load 14.

In the third state, the second and third switching arrangements 32, 33 are switched on to apply the capacitor voltage across the load 14 in the reverse direction, allowing the current to be reduced and transferring energy from the load 14 back to the capacitor 30. A dump resistor may be connected across the capacitor 30 to absorb the energy. The resistor may be located either inside or outside the cryogenic chamber.

The states of the converter 10 are controlled by the controller 16 which switches different pairs of switching arrangements on and off.

In normal operation when the load current is being increased or sustained at a constant level, the converter 10 toggles between the first state and the second state. The controller 16 simultaneously switches-on the first switching arrangement 31 and switches-off the second switching arrangement 32. It then toggles the third switching arrangement 33 and the fourth switching arrangement 34 to respectively charge and discharge the capacitor 30.

Referring to FIG. 3, the third switching arrangement 33 is switched on (gate voltage $T_3$ HIGH) and the fourth switching arrangement 34 is switched off (gate voltage $T_4$ LOW) while an increasing voltage $V_{DC}$ across the capacitor 30 is below a maximum threshold (e.g. $V_{DC\text{-}MAX}$). The fourth switching arrangement 34 is switched on (gate voltage $T_4$ HIGH) and the third switching arrangement 33 is switched off (gate voltage $T_3$ LOW) while a decreasing voltage $V_{DC}$ across the capacitor 30 is above a minimum threshold (e.g. 0).

The controller 16 may be a self-oscillating control system that charges and discharges the capacitor 30 in a cyclic manner.

In the first state, when the first and third switching arrangements 31, 33 are switched on, the capacitor 30 is charged gradually by the lower amplitude electric current ($I_{F\text{-}T}$) 8 and the voltage $V_{DC}$ increases approximately linearly to the maximum level of $V_{DC\text{-}MAX}$ at which point the state changes to the second state. The third switching arrangement 33 is turned off by the controller 16 and the fourth switching arrangement 34 is switched on.

In the second state, when the first and fourth switching arrangements 31, 34 are switched on the capacitor 30 is discharged rapidly by the load current. When $V_{DC}$ is equal to zero, or a non-zero minimum threshold, the state changes to the first state. The fourth switching arrangement 34 is turned off by the controller 16, the third switching arrangement 33 is switched back on, and the capacitor 30 starts to re-charge.

The controller 16 continuously monitors $V_{DC}$, changing the state of the converter 10 as the voltages rises to the maximum threshold $V_{DC\text{-}MAX}$ and falls to zero, or a non-zero minimum threshold.

A low transistor switching frequency is used in normal operation, which limits the switching losses and avoids high-frequency excitation of the load, which could cause high frequency losses in the coil.

The switching losses in the cryogenic converter 10 are low since one of the commutation events occurs with $V_{DC}$ at, or close to, zero, which reduces the heat load on the cryogenic system and increases efficiency. The system provides an orderly, well-controlled charging and discharging of the capacitor 30, allowing the use of a small capacitor value, which is important since the capacitor types that can be operated at low temperatures tend not to have very high values.

FIGS. 4A and 4B schematically illustrate different control systems for controlling the load current. The ambient temperature converter 20, which is located outside the cryogenic chamber 4, is configured to control the amplitude of a lower amplitude electric current 8 in response to a feedback signal 22 dependent upon the operation of the apparatus 2 and a target value.

A target value ($I^*_{S\text{-}C}$) 40 and the feedback signal ($I_{S\text{-}C}$) 22 are combined in a combiner 41 to produce a first error value ($I^*_{S\text{-}C}$-$I_{S\text{-}C}$), which is passed through a controller 42 having a transfer function H. The output of the controller 42, (H($I^*_{S\text{-}C}$-$I_{S\text{-}C}$)), and a measured value of the lower amplitude electric current ($I_{F\text{-}T}$) 8 are combined in a combiner 43 to produce a second error value (H($I^*_{S\text{-}C}$-$I_{S\text{-}C}$)-$I_{F\text{-}T}$). The second error value (H($I_{S\text{-}C}$-$I_{S\text{-}C}$)-$I_{F\text{-}T}$) is used to control the ambient temperature converter 20 to increase the amplitude of the lower amplitude electric current ($I_{F\text{-}T}$) 8.

A demand to increase the load current increases the target value ($I^*_{S\text{-}C}$) 40 with consequential positive increases in the first error value and the second error value. This results in an increase in the amplitude of the lower amplitude electric current ($I_{F\text{-}T}$) 8. The increased value of $I_{F\text{-}T}$ will cause the capacitor 30 to charge more rapidly, thereby increasing the operating frequency of the self-oscillating cryogenic converter 10 and increasing the load current. An increase in the load current is matched by an increase in the feedback signal 22. The increased value of the lower amplitude electric current ($I_{F\text{-}T}$) 8 therefore results in a reduction in the first and second error values.

In FIG. 4A, the ambient temperature converter 20 controls the load current in dependence upon a feedback signal 22 that is directly measured from the load current within the cryogenic chamber 4. The coil current, $I_{S\text{-}C}$, is sensed by a low temperature current sensor 50 in the cryogenic chamber 4 and is output as feedback signal 22 through galvanic output interface 18.

In FIG. 4B, the ambient temperature converter 20 controls the load current in dependence upon a feedback signal 22 that is inferred from measurements made outside the cryogenic chamber 4 of the voltage $V_{DC}$ across the capacitor 30.

The load current is inferred from outside the cryogenic chamber by monitoring the rate of change of the voltage $V_{DC}$ across the capacitor 30. By measuring the rate of rise of $V_{DC}$, and using the measured value of the charging current $I_{F\text{-}T}$ the value of the capacitor 30 can be determined.

$$[dV_{DC}/dt]_{rising} = I_{F\text{-}T}/C$$

Then C is used in the calculation of $I_{S\text{-}C}$ from the rate of fall of the voltage $V_{DC}$.

$$I_{S\text{-}C} = I_{F\text{-}T} - C \cdot [dV_{DC}/dt]_{falling}$$

This dynamic calculation removes any potential errors caused by the drift of the capacitor value with temperature or time.

In the embodiment of FIG. 4B, a low temperature current sensor is not required in the cryogenic chamber 4, although a current sensor will typically be used for the purpose of safety control as will be described below.

Returning now to FIG. 3, in each of the above-described examples, if the current levels in the circuit increase, the rates of change of $V_{DC}$ will also be higher, resulting in an increased operating frequency. This is indicated in schematic plot 44, for which the duration of the charging cycle 46 is decreased.

Each time the capacitor 30 is discharged from $V_{DC\text{-}MAX}$ to zero, a fixed quantum of energy equal to $(C_{DC}V^2_{DC\text{-}MAX})/2$, is transferred to the load 14. Therefore the higher operating frequency will increase the flow of energy to the load 14, and increase the load current during normal operation. However the inventors have determined that the monitoring of the load current $I_{S-C}$ in conjunction with the duration of the charging cycle of the capacitor 30 can provide an accurate and quick determination of quench onset, which can in turn be used to react to quench onset before damage to the apparatus is incurred.

In this regard, either controller 16 within the chamber 22 or else an external controller (shown schematically as controller 42 in FIGS. 4A and 4B) can be used to monitor changes in the charge/discharge cycle time and also any changes in the load current $I_{S-C}$ in order to determine whether a quench incident is occurring.

In this embodiment switching events are used to determine the charge-and-discharge cycle time for the capacitor 30. In particular the time between each successive instance of the switching on of the first and third switching arrangements 31, 33 (i.e. to short-circuit the load and initiate charging of the capacitor) is recorded. In other embodiments, any other cyclic switching event indicative of an event in the charge/discharge cycle could be used to a similar end.

At the $n^{th}$ switching event the controller records the switching period $T_{(n)}$ and the superconducting coil current $I_{(n)}$ (i.e. the current $I_{S-C}$ at event n). Such records of switching period and coil current are stored by the controller for a previous number, m, of switching events, resulting in a series of stored records accessible to the controller: $T_{(n-1)}, \ldots T_{(n-m)}$ and $I_{(n-1)}, \ldots I_{(n-m)}$.

A trend in switching period and coil current is determined by undertaking calculations of the form:

$$f(T_{(n)}, \ldots T_{(n-m)}), \text{ and } g(I_{(n)}, \ldots I_{(n-m)}),$$

where f and g may be linear or non-linear functions of the sampled values.

A trend in switching period of the form $f(T_{(n)}, \ldots T_{(n-m)})<0$ indicates a falling switching period (increasing frequency), whereas a trend in coil current of the form $g(I_{(n)}, \ldots I_{(n-m)})\leq 0$ indicates an unchanging or falling current. The onset of a quench is therefore inferred by the following logical condition:

If $f(T_{(n)}, \ldots T_{(n-m)})<0$ AND $g(I_{L(n)}, \ldots I_{L(n-m)})\leq 0$ then a quench is occurring.

The nature of the functions f and g to be used in the calculation and the number, m, of previous samples required will vary between different applications according to the operating frequency, the coil inductance, the sampling resolution (number of bits) used to measure the coil current and the required speed of response. A greatest speed of response can be achieved by using a single comparative value from the switching instance at time n−1, although it is acknowledged that a plurality of successive events will typically be compared to increase the certainty with which quench conditions are determined.

Thus the controller can determine a quench condition in response to the natural, self-oscillating operating frequency of the converter, whereby an increase in flow of energy into the coil is determined by an increase in discharge frequency of the capacitor and the instantaneous coil current is determined by a suitable sensor. This technique allows readily available signals to be used such that a controller merely requires programming with the appropriate routines in order to allow quench detection in a cost-effective and responsive manner. It is also noted that any time delay associated with filtering out of normal system fluctuations is avoided by conducting a simple check of the two signals in conjunction as discussed above. This time saving can be crucial in effectively diagnosing quench conditions in a manner which allows action to be taken to prevent damage to the apparatus.

Upon determination of a quench condition, any of the controllers discussed above can issue a control signal to prevent further discharge of the capacitor 30 to the coil 14. This may represent a safety mode of operation in addition to the normal operation modes described above. In one embodiment, which is in many ways preferred, the controller instructs a switching event to divert discharge from the capacitor to a dissipative resistor, which may be located inside or outside of the cryogenic chamber as required. Various alternative embodiments of safety circuit can be implemented, which may include one or more further switches to those shown in FIG. 2, as will be appreciated by those skilled in the art. Furthermore, an additional energy store could be provided which is charged by the discharge from the capacitor 30.

In one embodiment, the controller issues safety control instructions to shut down the apparatus 2, for example by inhibiting the supply of power to the cryogenic chamber by the ambient temperature converter 20. The controller may enter into a safety mode in which a structured set of control instructions is sent to both the ambient converter 20 and cryogenic converter 10.

Although embodiments of the present invention have been described in the preceding paragraphs with reference to various examples, it should be appreciated that modifications to the examples given can be made without departing from the scope of the invention as claimed. For example, a variety of different circuit topologies could be used for either the ambient temperature converter 10 or low temperature converter 20. The ambient temperature converter 20 could be an AC-DC converter that draws power from the AC utility and may include a transformer, for example a rotating transformer to couple the energy across to the rotor of an electrical machine.

Possible uses for supplying superconducting magnets may include medical applications such as, for example, Nuclear magnetic Resonance (NMR) body scanners, or for scientific instrument applications.

Implementation of any of the controllers described above can be in hardware alone (a circuit, a processor . . . ); can have certain aspects in software including firmware alone;, or can be a combination of hardware and software (including firmware).

It should be appreciated that the H-bridge arrangement 35 (FIG. 2) may be operated in a different way to achieve the same functionality. For example, the roles of the first switching arrangement 31 and the second switching arrangement 32 may be swapped and the roles of the third switching arrangement 33 and the fourth switching arrangement 34 may be swapped.

Features described in the preceding description may be used in combinations other than the combinations explicitly described.

Functions described above with reference to certain physical features may be performable by other features whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   a cryogenic chamber;
   a device for storing electric charge located within the chamber, the device being connected to an interface on the exterior of the chamber and to a load within the chamber, wherein the device operates according to predetermined charge and discharge cycles such that energy is stored and subsequently transferred to the load in a successive manner in use; and,
   a controller configured to monitor the charge and/or discharge cycle of the device in order to determine the onset of an adverse operating condition within the chamber.

2. An apparatus according to claim 1, wherein the adverse condition is a quench condition.

3. An apparatus according to claim 1, wherein the device is arranged to transfer a predetermined quantum of energy to the load during each discharge cycle.

4. An apparatus according to claim 1, wherein the controller monitors the duration of a charge and/or discharge cycle of the device.

5. An apparatus according to claim 4, wherein the controller compares an instantaneous duration of the charge and/or discharge cycle of the device with a stored duration value.

6. An apparatus according to claim 1, wherein the controller is arranged to monitor the current on the load.

7. An apparatus according to claim 6, wherein the load comprises a super conducting member and the controller monitors the current in the superconducting member directly by way of an instantaneous load current sensor.

8. An apparatus according to claim 6, wherein the controller compares an instantaneous monitored current in the load with a stored current value.

9. An apparatus according to claim 5, wherein the stored value of duration and/or current comprises one or more values previously monitored by the controller.

10. An apparatus according to claim 9, wherein the controller determines a trend in changes in values of current and/or duration over a plurality of successive charge and/or discharge cycles and determines whether said trend is indicative of an adverse operating condition.

11. An apparatus according to claim 8, wherein the controller determines the onset of an adverse condition in the event that the measured current is less than or equal to the stored current value, whilst the duration of the charge and/or discharge cycle is less than the stored duration value.

12. An apparatus according to claim 1, wherein the device comprises a switching arrangement for switching between a first condition, in which energy is transferred from the device to the load, and a second condition, in which the transfer of energy from the device to the load is inhibited, the controller inhibiting actuation of the switching arrangement into the first condition upon determination of an adverse condition.

13. An apparatus according to claim 1, wherein the controller is arranged to inhibit further supply of power to the device upon determination of an adverse condition.

14. An apparatus according to claim 1, wherein the chamber interface comprises a galvanic input interface to the cryogenic chamber, which is configured to receive a lower amplitude electric current and the device comprises a converter configured to convert the lower amplitude electric current, provided by the galvanic input interface, to a higher amplitude electric current for supply to the load within the cryogenic chamber, the controller configured to control the converter.

15. An apparatus according to claim 1, further comprising a current controller located outside the cryogenic chamber and configured to control the amplitude of electric current supplied to the device, for example in response to a target and a feedback signal dependent upon the operation of the apparatus.

16. A method of cryogenic power control comprising:
   providing an electric current to a cryogenic chamber such that a device for storing electric energy within the chamber undertakes successive predetermined charge and discharge cycles, the energy stored by the device being transferred to a load within the chamber;
   monitoring the charge and/or discharge cycle of the device; and determining the onset of a quench condition within the chamber based upon a change in the charge and/or discharge cycle.

* * * * *